United States Patent Office 2,853,429
Patented Sept. 23, 1958

2,853,429
METHOD FOR CATALYTICALLY HYDRODESUL- FURIZING PETROLEUM OILS

André Gislon, and André Marie Valet, Paris, France, assignors to Societe Anonyme dite: Compagnie Française de Raffinage, Paris, France, a corporation of France No Drawing. Application March 22, 1956
Serial No. 573,107

Claims priority, application France March 26, 1955
11 Claims. (Cl. 196—24)

The present invention relates to the elimination of sulfur contained in hydrocarbon fractions of the petroleum type, without the simultaneous elimination of the remaining hydrocarbons to which the sulfur is chemically bound.

It is well known, on the one hand, that the greater part of petroleum products contain sulfur in more or less substantial quantities, generally present in the form of organic sulfurated compounds. Thus, the great majority of the products treated at the present time have a relatively high content of sulfur and, in consequence, the distillation fractions obtained contain fairly large quantities of sulfurated compounds; in particular, in the case of the heavy fractions, such as lamp-oils, gas-oils, etc., the sulfur is generally found in the form of heterocyclic compounds which are very difficult to decompose and to eliminate. Now, it is recognized that such sulfurated compounds give rise during their combustion to the formation of products which have highly corrosive properties. It is for this reason that the petroleum industry has applied itself for a number of years to the problem of eliminating the said organic sulfurated compounds of hydrocarbons of the petroleum type and of their distillation fractions.

On the other hand, it is well known that a large number of methods exist of dividing the heavy organic molecules contained in hydrocarbons of the petroleum type; the majority of these said methods make use of catalytic agents; this is especially the case with methods of catalytic cracking, of dehydrogenation, of hydrogenation, of hydroforming, of a re-forming, of desulfurization, etc. The catalysts mainly employed in these techniques comprise, amongst others, oxides and other compounds of the metals of Groups II, VI and VIII of the Mendeleef Periodic Classification, and more particularly the oxides and sulfides of magnesium, zinc, molybdenum, tungsten, cobalt and nickel, no limitation being implied by the recital of this list. The said compounds may be used singly or in mixtures.

As far as the particular problem of the elimination of organic sulfurated compounds of petroleum fractions is concerned, the industrial methods of catalytic hydrosulfurization at a pressure greater than atmospheric pressure and at high temperatures, necessitate first of all that catalytic agents shall be perfected, having high qualities both from the catalytic point of view and also that of mechanical strength before and after their use and regeneration, and in addition, it is important that such agents should be economical from the industrial point of view.

The present invention has for its object a method of eliminating sulfur from petroleum products by hydrogenation of the fractions of distillation; it has also for its object the provision of catalysts suitable for this elimination of sulfur which is present in the form of sulfurated organic compounds; it also includes the method of preparation of the said catalysts.

To this end, the applicants have perfected a method of manufacture of hydro desulfurization catalysts and the adequate method of treatment of hydrocarbon fractions containing sulfur, in the presence of these catalysts.

The catalysts which are described in the invention are produced in the remarkable physical form of a porous element having a good mechanical strength and lending itself to any kind of handling; in addition, this catalyst has the property of great activity.

The said catalysts are obtained by subjecting the products of reaction of a mixture of molybdic or tungstic acid with heavy calcined magnesia in the presence of water, to the action of an evolution of gas which is adapted to make them porous.

In accordance with an important feature of the invention, this action may particularly be obtained by using the property possessed by aluminum, of decomposing hydrogen peroxide, the liberated oxygen thus producing the desired porosity of the catalyst.

It is known that the products of reaction of molybdic or tungstic acids and heavy calcined magnesia will set and harden to give a cement; but the applicants have found that it is advantageous to use this cement having a good mechanical strength, before and after reduction, as a catalyst of the kind referred to, and they have established that it is possible and advantageous to reduce the density of this cement by modifying its structure in such manner as to make it porous without thereby adversely affecting its mechanical strength and at the same time increasing its activity by virtue of the increase of active surface which is the direct result of its porosity.

The hydrogenating activity of a catalyst of this kind may be increased by the addition of a more or less substantial quantity of derivatives of the metals of Groups II and VIII, for example of chlorides and oxides of zinc, of cobalt or of nickel, which play the part of promoters or activators of hydrogenation.

In this respect, the applicants have found that, in the case of cobalt, the maximum activity of such a catalyst corresponds to a molar fraction $$\frac{\text{Cobalt}}{\text{Cobalt} + \text{molybdenum}}$$

of 0.20; in fact, the curve of activity of catalysts of this type as a function of the content of cobalt and molybdenum is a maximum for such a value. It follows therefore that there will be an advantage in working in a zone fairly close to the ratio indicated, namely in fact between 0.17 and 0.25.

The following examples (which are not given in any restrictive or limited sense) describe the method of preparation of the said catalysts and illustrate this application of the present invention.

*Example 1*

The following constituents are intimately mixed in a ball-mill:

| | Grams |
|---|---|
| Molybdic acid | 320 |
| Cobalt chloride (6H$_2$O) | 143 |
| Heavy calcined magnesia | 75 |
| Aluminum in powder | 7 |

The mixture is sifted, after which there is prepared, by mixing with hydrogen peroxide at 10 volumes, a fairly soft paste which can be extruded in the form of a cylindrical cord of about 5 to 6 mm. in diameter, which, after drying under the action of infra-red radiation for example, or at about 110° C., becomes hard and strong; this cord is then broken up into short lengths of about 8 mm.

This catalyst is directly placed in the catalytic ovens which are to be used for the hydrodesulfurization treatment of the petroleum type products, and it is then treated by a current of hydrogen at a temperature of 400° C.

*Example 2*

In order to reduce the cost of manufacture of the catalysts in accordance with the invention, the applicants have found that the quantity of calcined magnesia, more particularly with respect to the salts of cobalt, nickel, etc., could be increased in considerable proportions, without thereby modifying either the activity of the said catalysts or their mechanical strength.

Thus, a catalyst in accordance with the invention is prepared by treating the following constituents in accordance with the same method as for Example 1:

| | Grams |
|---|---|
| Molybdic acid | 320 |
| Cobalt oxide | 45 |
| Heavy calcined magnesia | 300 |
| Aluminum in powder | 7 |

*Example 3*

A catalyst is prepared by treating the constituents given below by the same method as described with respect to Example 1:

| | Grams |
|---|---|
| Tungstic acid | 358 |
| Chloride of nickel | 55 |
| Heavy calcined magnesia | 220 |
| Aluminum in powder | 7 |

Having now described the general principles and having given examples of the preparation of catalysts in accordance with the present invention, with a base of salts of tungsten, molybdenum, magnesium, zinc, cobalt and nickel, the description and the examples which follow below refer to a process of hydrodesulfurization of the fractions of distillation of products of the petroleum type which contain sulphur in the form of sulfurated hydrocarbons, in the presence of the above-described catalysts. These examples will bring out results which show the improvements effected by the present invention.

In a general way, this method of hydro-desulfurization consists in bringing a mixture of hydrogen and sulfurated hydrocarbons derived from fractions of distillation of petroleum products into contact with a catalyst such as has been described above, in an oven heated to a given temperature and at a predetermined pressure. The sulfurated compounds are then decomposed into utilizable hydrocarbon fractions and sulfur in the form of sulfurated hydrogen, which is easily eliminated from the products treated by any known means, such as a simple washing with an alkaline lye, for example.

*Example 4*

A straight-run gas-oil (a fraction of 215–370° C.), containing 1.06% of sulfur is caused to pass over a layer of 6 litres and having a height of about 80 cm., of a catalyst such as described in Example 1, in the form of short sticks of 5 x 8 mm. This catalyst is subjected to a preliminary treatment in situ at 400° C. for several hours by hydrogen at atmospheric pressure.

The reaction temperature is 400° C. and the pressure is 30 atmospheres. The rate of flow of hydrocarbon at the intake is 1 litre of gas-oil per litre of catalyst and per hour, and the rate of flow of the hydrogen is 500 litres per litre of hydrocarbon.

The product when treated under the above conditions only contains a total quantity of 0.29% of sulfur and the degree of desulfurization has reached 73%.

*Example 5*

A catalytic cycle-stock (a fraction of 200–320° C.) containing 1.9% of sulfur is treated over a layer of 6 litres of a catalyst such as described in Example 1, and previously treated as specified above in Example 4.

The reaction temperature is 400° C. and the pressure is 20 atmospheres. The rate of flow of hydrocarbon at the intake is 2.5 litres of cycle-stock per litre of catalyst and per hour, and that of the hydrogen is 200 litres per litre of hydrocarbon.

This product, when treated in these conditions, only contains a total quantity of 0.48% of sulfur, and the degree of desulfurization is 75%.

*Example 6*

If a straight-run gas-oil (a fraction of 215–370° C.) containing 0.92% of sulfur is treated under conditions identical with those given in Example 4, but in the presence of a catalyst such as described in Example 2, and previously treated by a current of hydrogen at 400° C. at atmospheric pressure for several hours; the hydrocarbon obtained after treatment contains only a total quantity of 0.23% of sulfur, which corresponds to a degree of desulfurization of 75%.

*Example 7*

The same cycle-stock as that employed for Example 5 is treated under the same conditions as those of Example 4, in the presence of a catalyst such as described in Example 3 and previously treated by a current of hydrogen at 400° C. at atmospheric pressure for several hours; the hydrocarbon obtained only contains a total quatity of 0.32% of sulfur, which corresponds to a degree of desulfurization of 83%.

The temperatures and pressures given in the above examples are by no way limitative. In practice, the method can be applied to temperatures between 320° and 400° C. and under pressures up to 100 atmospheres.

We claim:

1. In a process for desulfurizing hydrocarbon products of the petroleum type containing sulfur, by the action of hydrogen or of hydrogen containing gases at a temperature between 320° and 450° C. and at a pressure between 1 and 100 atmospheres, the improvement which comprises treating said products in the presence of a catalyst having good mechanical strength, said catalyst having been prepared in the form of a cement obtained by the reaction of an acid of a metal of group VI with magnesium oxide and a group VIII metal salt, said catalyst also having been made porous by the decomposition of hydrogen peroxide by aluminum.

2. The process according to claim 1 wherein said group VI metal is tungsten.

3. The process according to claim 1 wherein said group VI metal is molybdenum.

4. The process according to claim 1 wherein the group VIII metal of the said metal salt is nickel.

5. The process according to claim 1 wherein the group VIII metal of the said metal salt is cobalt.

6. The process according to claim 1 wherein the said group VIII metal salt is an oxide.

7. The process according to claim 1 wherein the said group VIII metal salt is a chloride.

8. The process according to claim 1 wherein said catalyst has been prepared by reaction of tungstic acid, magnesium oxide and a nickel salt.

9. The process according to claim 1 wherein said catalyst has been prepared by reaction of molybdic acid, magnesium oxide and a cobalt salt.

10. The process according to claim 9 wherein the molar fraction $$\frac{\text{Cobalt}}{\text{Cobalt}+\text{molybdenum}}$$

of said catalyst lies between 0.17 and 0.25.

11. The process according to claim 1 wherein said catalyst, prior to the treatment of the said petroleum products, has been activated by direct action of hydrogen at a high temperature.

References Cited in the file of this patent

UNITED STATES PATENTS

| 1,946,109 | Pier et al. | Feb. 6, 1934 |
| 2,437,532 | Huffman | Mar. 9, 1948 |
| 2,487,466 | Nahin | Nov. 8, 1949 |

OTHER REFERENCES

Serial No. 401,522, Schneider (A. P. C.), published July 13, 1943.

UNITED STATES PATENT OFFICE
CERTIFICATE OF CORRECTION

Patent No. 2,853,429                                                September 23, 1958

André Gislon et al.

It is hereby certified that error appears in the printed specification of the above numbered patent requiring correction and that the said Letters Patent should read as corrected below.

Column 1, line 40, for "of a re-forming," read -- of re-forming, --; lines 51 and 52, for "hydro-sulfurization" read -- hydro-desulfurization --; column 2, line 1, for "element" read -- cement --.

Signed and sealed this 27th day of January 1959.

(SEAL)
Attest:

KARL H. AXLINE                                                ROBERT C. WATSON
Attesting Officer                                         Commissioner of Patents